US011923723B2

(12) United States Patent
Shigeta

(10) Patent No.: US 11,923,723 B2
(45) Date of Patent: Mar. 5, 2024

(54) UNINTERRUPTIBLE POWER SUPPLY

(71) Applicant: TOSHIBA MITSUBISHI-ELECTRIC INDUSTRIAL SYSTEMS CORPORATION, Chuo-ku (JP)

(72) Inventor: Hiroki Shigeta, Chuo-ku (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 190 days.

(21) Appl. No.: 17/600,218

(22) PCT Filed: Jan. 15, 2020

(86) PCT No.: PCT/JP2020/001027
§ 371 (c)(1),
(2) Date: Sep. 30, 2021

(87) PCT Pub. No.: WO2021/144878
PCT Pub. Date: Jul. 22, 2021

(65) Prior Publication Data
US 2022/0190637 A1    Jun. 16, 2022

(51) Int. Cl.
*H02J 9/06* (2006.01)
*H02J 7/02* (2016.01)

(52) U.S. Cl.
CPC ............... *H02J 9/062* (2013.01); *H02J 7/02* (2013.01); *H02J 2207/20* (2020.01)

(58) Field of Classification Search
CPC .......... H02J 9/062; H02J 7/02; H02J 2207/20
USPC ...................................... 307/66, 64
See application file for complete search history.

(56) References Cited

U.S. PATENT DOCUMENTS

| 7,372,177 | B2 | 5/2008 | Colombi et al. | |
|---|---|---|---|---|
| 2016/0111917 | A1* | 4/2016 | Ghosh | H02J 9/062 307/66 |
| 2017/0070074 | A1* | 3/2017 | Sugeno | H02J 9/062 |
| 2017/0149276 | A1 | 5/2017 | Toyoda | |
| 2020/0389045 | A1* | 12/2020 | Chen | H02J 9/066 |

FOREIGN PATENT DOCUMENTS

| CN | 106410952 A | 2/2017 |
|---|---|---|
| CN | 106471704 A | 3/2017 |
| JP | 5-260683 A | 10/1993 |
| JP | 2004-254363 A | 9/2004 |

(Continued)

OTHER PUBLICATIONS

International Search Report and Written Opinion (with English Translation) dated Feb. 10, 2020 in PCT/JP2020/001027, 14 pages.

(Continued)

*Primary Examiner* — Michael R. Fin
(74) *Attorney, Agent, or Firm* — Oblon, McClelland, Maier & Neustadt, L.L.P.

(57) ABSTRACT

In the uninterruptible power supply, when the input switch is connected between the input terminal and the AC node of the converter and the fourth operation mode is selected, the input switch is turned off and the bypass switch is turned on, and the converter is controlled to convert the DC power of the battery into AC power and supply the AC power to the load via the bypass switch. Thus, even if the inverter is failed when the commercial AC power source is failed, it is possible to drive the load.

8 Claims, 9 Drawing Sheets

(56) References Cited

FOREIGN PATENT DOCUMENTS

JP       2004-254363 A     9/2004
WO    WO2015/198448 A1   12/2015

OTHER PUBLICATIONS

Office Action dated Jul. 6, 2021 in corresponding Japanese Patent Application No. 2020-533036 (with English Translation), 14 pages.
Indian Office Action dated Aug. 22, 2022 in Indian Patent Application No. 202117042799, 6 pages.
Office Action dated Nov. 30, 2023, issued in counterpart Chinese Patent Application No. 202080028151.1, filed on Jan. 15, 2020, with English machine translation, citing documents 15, 16 and 17.

\* cited by examiner (A) NORMAL (B) POWER FAILURE (A) NORMAL (B) POWER FAILURE (A) NORMAL (B) POWER FAILURE (A)

(B)

(A) NORMAL (B) POWER FAILURE

UNINTERRUPTIBLE POWER SUPPLY

TECHNICAL FIELD

The present invention relates to an uninterruptible power supply, and more particularly to an uninterruptible power supply which supplies power in a constant bypass power supply mode.

BACKGROUND ART

For example, U.S. Pat. No. 7,372,177 (PTL 1) discloses an uninterruptible power supply including: a bypass switch which is connected between an AC power source and a load and is turned on when the AC power source is normal and turned off when the AC power source is failed; a rectifier which converts AC power supplied from the AC power source into DC power and stores the DC power in the power storage device; and an inverter which converts the DC power of the power storage device into AC power and supplies the AC power to the load when the AC power source is failed.

CITATION LIST

Patent Literature

PTL 1: U.S. Pat. No. 7,372,177

SUMMARY OF INVENTION

Technical Problem

However, in the conventional uninterruptible power supply, if the inverter is failed and the AC power source is failed, it is impossible to drive the load.

Therefore, it is a main object of the present invention to provide an uninterruptible power supply capable of driving a load even if a second power converter is failed and an AC power source is failed.

Solution to Problem

An uninterruptible power supply according to the present invention includes: a first switch that has one terminal receiving AC power supplied from an AC power source and has the other terminal connected to an AC node; a second switch that has one terminal connected to the AC node and has the other terminal connected to a load; a first power converter that exchanges power between the AC node and a power storage device; a second power converter that exchanges power between the power storage device and the other terminal of the second switch; and a controller that selects any power supply mode from a first power supply mode, a second power supply mode and a third power supply mode, and executes power supply operations in accordance with the selected power supply mode. When the first power supply mode is selected, the controller turns on the first switch and the second switch so as to supply AC power from the AC power source to the load via the first switch and the second switch, and controls the first power converter so as to convert the AC power supplied from the AC power source via the first switch into DC power and store the DC power in the power storage device. When the second power supply mode is selected, the controller turns off the first switch, and controls the second power converter so as to convert the DC power of the power storage device into AC power and supply the AC power to the load. When the third power supply mode is selected, the controller turns off the first switch and turns on the second switch, and controls the first power converter so as to convert the DC power of the power storage device into AC power and supply the AC power to the load via the second switch.

Advantageous Effects of Invention

In the uninterruptible power supply according to the present invention, when the third power supply mode is selected, the first switch is turned off, the second switch is turned on, and the first power converter is controlled to convert the DC power of the power storage device into AC power and supply the AC power to the load via the second switch. Therefore, even if the second power converter is failed and the AC power source is failed, it is possible to drive the load by selecting the third power supply mode.

DESCRIPTION OF EMBODIMENTS

First Embodiment

Figure 1:
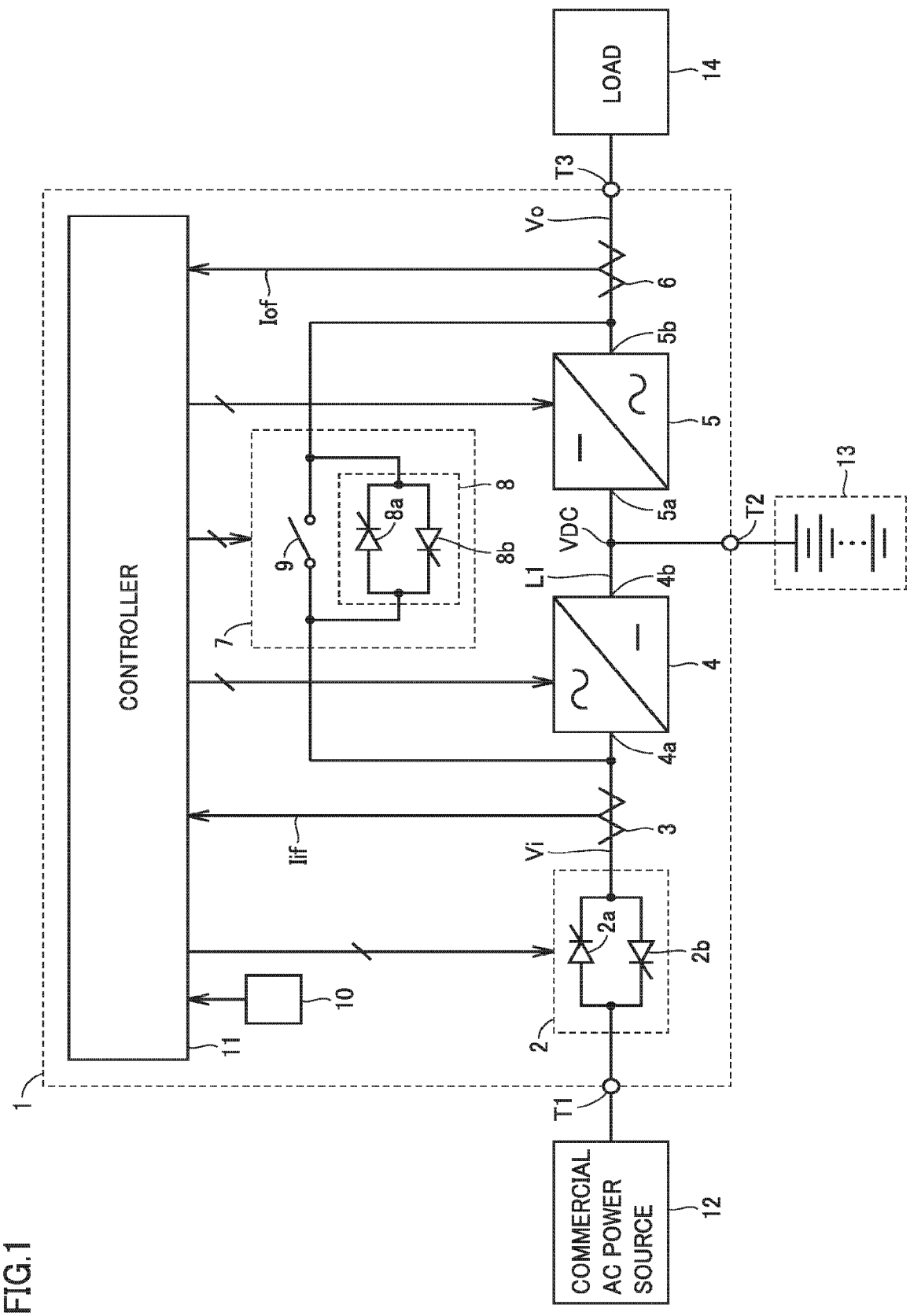
FIG. 1 is a circuit block diagram illustrating a configuration of an uninterruptible power supply according to a first embodiment.

FIG. 1 is a circuit block diagram illustrating a configuration of an uninterruptible power supply 1 according to a first embodiment of the present invention. As illustrated in FIG. 1, the uninterruptible power supply 1 includes an input terminal T1, a battery terminal T2, an output terminal T3, an input switch 2, current detectors 3 and 6, a converter 4, a DC line L1, an inverter 5, a bypass switch 7, an operation unit 10, and a controller 11.

The input terminal T1 receives AC power of a commercial frequency from a commercial AC power source 12. The battery terminal T2 is connected to a battery (power storage device) 13. The battery 13 stores DC power. A capacitor may be adopted to replace the battery 13. The output terminal T3 is connected to a load 14. The load 14 is driven by AC power.

One terminal of the input switch 2 (first switch) is connected to the input terminal T1, and the other terminal thereof is connected to an AC node 4a of the converter 4. The input switch 2 includes a pair of thyristors 2a and 2b (a first thyristor and a second thyristor) connected in antiparallel to each other. An anode of the thyristor 2a is connected to the input terminal T1, and a cathode thereof is connected to the AC node 4a of the converter 4. An anode of the thyristor 2b is connected to the AC node 4a of the converter 4, and a cathode thereof is connected to the input terminal T1. The ON and OFF of the input switch 2 (that is, the thyristors 2a and 2b) is controlled by the controller 11.

Referring back to FIG. 1, an instantaneous value of an AC input voltage Vi present at the other terminal of the input switch 2 is detected by the controller 11. Whether or not the commercial AC power source 12 is failed is determined based on the instantaneous value of the AC input voltage Vi. The current detector 3 detects an AC input current Ii flowing through the other terminal of the input switch 2 and the AC node 4a of the converter 4, and provides a signal Iif indicating the detected value to the controller 11.

The converter 4 (first power converter) includes a plurality of IGBTs (Insulated Gate Bipolar Transistor) and a plurality of diodes, and is controlled by controller 11 to exchange power between the AC node 4a and a DC node 4b. During the forward conversion operation, the converter 4 converts the AC power supplied to the AC node 4a into DC power and outputs the DC power to the DC node 4b. In the reverse conversion operation, the converter 4 converts the DC power supplied to the DC node 4b into AC power of a commercial frequency and outputs the AC power to the AC node 4a.

The DC line L1 is provided between the DC node 4b of the converter 4 and a DC node 5a of the inverter 5, and is connected to the battery terminal T2. An instantaneous value of a DC voltage VDC present at the DC line L1 (that is, the inter-terminal voltage VDC of the battery 13) is detected by the controller 11.

The inverter 5 (second power converter) includes a plurality of IGBTs and a plurality of diodes, and is controlled by the controller 11 to exchange power between the DC node 5a and an AC node 5b. During the reverse conversion operation, the inverter 5 converts the DC power supplied to the DC node 5a into AC power of a commercial frequency and outputs the AC power to the AC node 5b. During the forward conversion operation, the inverter 5 converts the AC power supplied to the AC node 5b into DC power and outputs the DC power to the DC node 5a.

The AC node 5b of the inverter 5 is connected to the output terminal T3. The current detector 6 detects an instantaneous value of an current Io flowing between the AC node 5b of the inverter 5 and the output terminal T3, and provides a signal Iof indicating the detected value to the controller 11. An instantaneous value of the AC output voltage Vo present at the output terminal T3 is detected by the controller 11.

The bypass switch 7 (second switch) includes a thyristor switch 8 connected between the AC node 4a of the converter 4 and the AC node 5b of the inverter 5, and an electromagnetic contactor 9 connected in parallel to the thyristor switch 8. The thyristor switch 8 has the same configuration as the input switch 2, and includes a pair of thyristors 8a and 8b connected in antiparallel to each other. An anode and a cathode of the thyristor 8a are connected to the AC nodes 4a and 5b, respectively, and an anode and a cathode of the thyristor 8b are connected to the AC nodes 5b and 4a, respectively. However, in comparison with the input switch 2, the thyristor switch 8 is constituted by smaller and cheaper thyristors 8a and 8b.

The ON and OFF of the thyristor switch 8 and the ON and OFF of the electromagnetic contactor 9 are controlled by the controller 11. At the time of turning on the bypass switch 7, the controller 11 turns on the thyristor switch 8 instantaneously and turns on the electromagnetic contactor 9 at the meantime, and turns off the thyristor switch 8 after a predetermined time has elapsed. This is to prevent the thyristor switch 8 from being damaged from overheating.

The operation unit 10 (selection unit) includes a plurality of buttons to be operated by the user of the uninterruptible power supply 1 and an image display for displaying various information. The user may use the operation unit 10 to turn on or off the power supply of the uninterruptible power supply 1, or to select a constant bypass power supply mode or a constant inverter power supply mode.

The controller 11 controls the uninterruptible power supply 1 based on a signal from the operation unit 10, the AC input voltage Vi, the AC input current Ii, the DC voltage VDC, the AC output current Io, the AC output voltage Vo, and the like. In addition, the controller 11 detects whether or not there is a power failure based on a detected value of the AC input voltage Vi, and detects whether or not the converter 4, the inverter 5 or the like is failed. Further, the controller 11 selects any operation mode a first to tenth operation modes based on the signal from the operation unit 10, the presence or absence of a power failure, and the presence or absence of a failure, and executes power supply operations in accordance with the selected operation mode.

Figure 2:
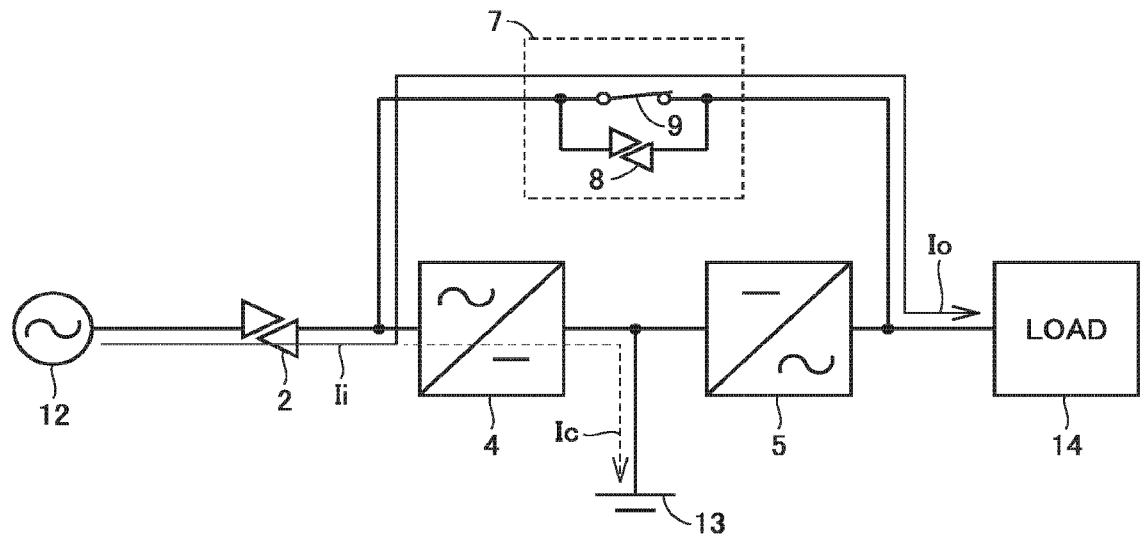
FIG. 2 is a circuit block diagram illustrating a first operation mode and a second operation mode of the uninterruptible power supply illustrated in FIG. 1.
Figure 2:
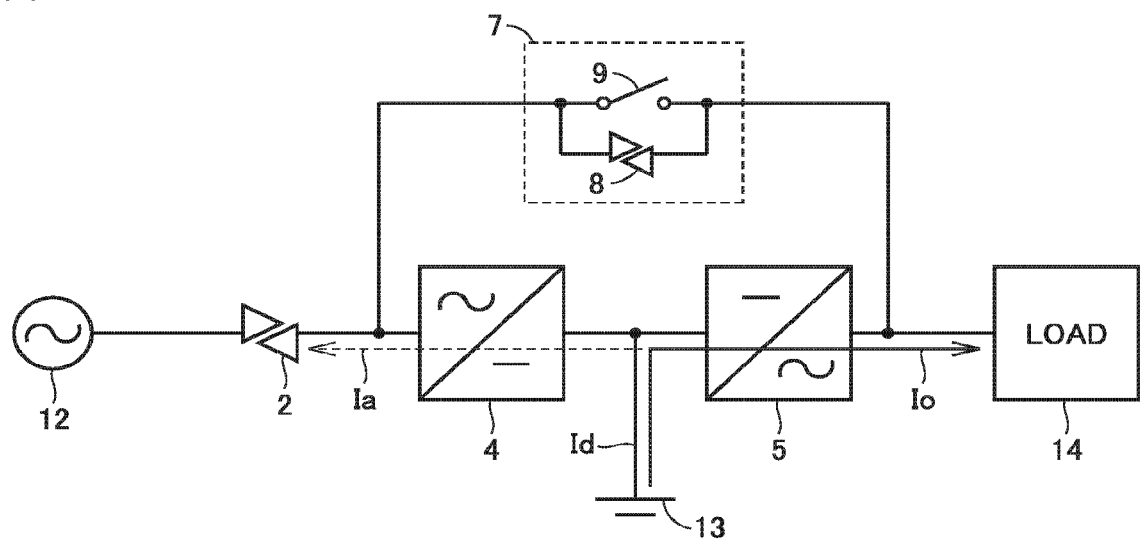

FIGS. 2(A) and 2(B) are circuit block diagrams illustrating a first operation mode and a second operation mode, respectively. When the constant bypass power supply mode is selected, if the converter 4, the inverter 5 and the like are not failed and the AC power is normally supplied from the commercial AC power source 12 (i.e., the commercial AC power source 12 is normal), the controller 11 selects the first operation mode. When the commercial AC power source 12 is failed during the execution of power supply operations in accordance with the first operation mode, the controller 11 selects the second operation mode.

When the first operation mode (first power supply mode) is selected, as illustrated in FIG. 2(A), the controller 11 turns on the input switch 2 and the bypass switch 7 so as to supply the AC power from the commercial AC power source 12 to the load 14 via the input switch 2 and the bypass switch 7. The controller 11 controls the converter 4 to convert the AC power supplied from the commercial AC power source 12 via the input switch 2 into DC power and store the DC power in the battery 13.

In this case, a large part of the AC input current Ii supplied from the commercial AC power source 12 via the input switch 2 is supplied to the load 14 via the bypass switch 7 as the AC output current Io, and a small part of the AC input current Ii is converted into a charge current Ic by the converter 4 and supplied to the battery 13.

When the second operation mode (second power supply mode) is selected, as illustrated in FIG. 2(B), the controller 11 turns off the input switch 2 and the bypass switch 7, and controls the inverter 5 to convert the DC power of the battery 13 into AC power and supply the AC power to the load 14.

When a power failure occurs, the controller 11 supplies an assist current Ia to the input switch 2 so as to instantly turn off the input switch 2. In other words, when a power failure occurs, the controller 11 stops the output of a pulse signal for turning on the thyristors 2a and 2b, and controls the converter 4 to supply an assist current Ia having a polarity opposite to that of the AC input current Ii flowing in the forward bias direction of the thyristors 2a and 2b to the thyristors 2a and 2b so as to turn off the thyristors 2a and 2b.

In this case, a large part of a discharge current Id from the battery 13 is converted into the AC output current Io by the inverter 5 and supplied to the load 14, and a small part of the discharge current Id is converted into the assist current Ia by the converter 4 and supplied to the input switch 2.

In the second operation mode, the bypass switch 7 may be maintained in the ON state. In this case, when the commercial AC power source 12 becomes normal again, it is possible to quickly go back to the first operation mode.

Figure 3:
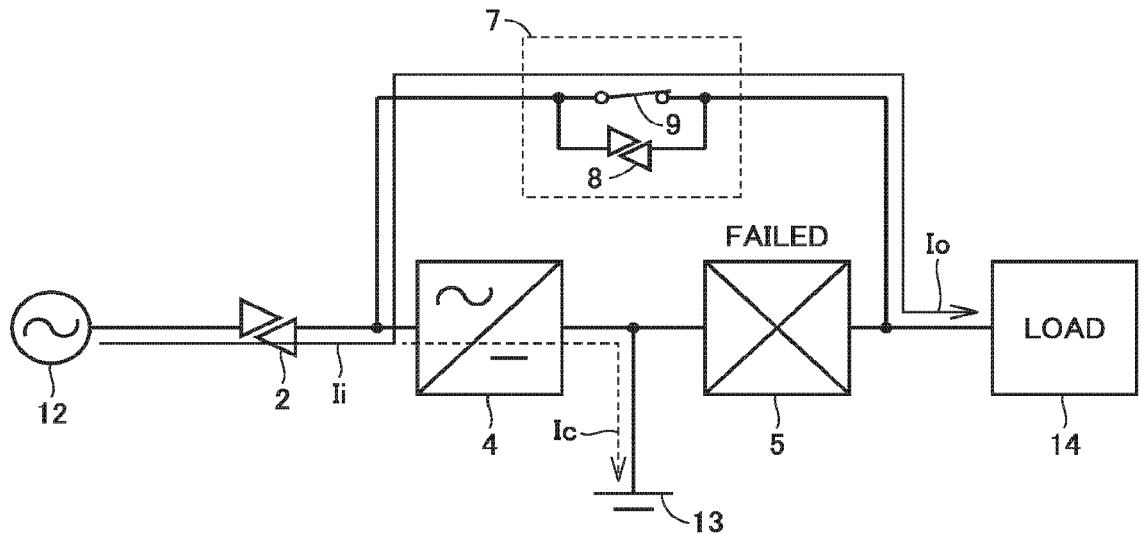
FIG. 3 is a circuit block diagram illustrating a third operation mode and a fourth operation mode of the uninterruptible power supply illustrated in FIG. 1.
Figure 3:
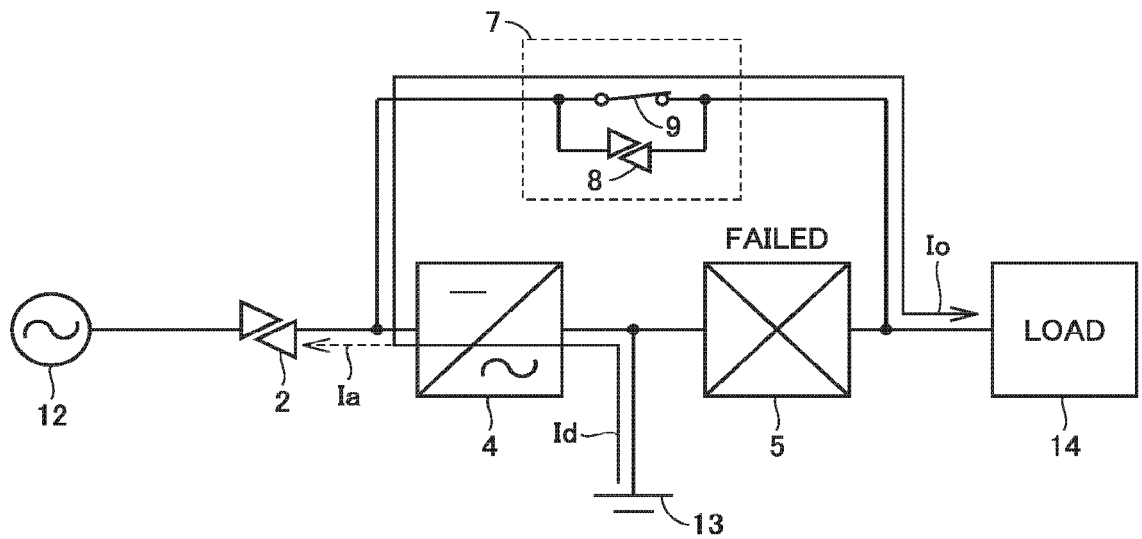

FIGS. 3(A) and 3(B) are circuit block diagrams illustrating a third operation mode and a fourth operation mode, respectively. When the constant bypass power supply mode is selected and AC power is normally supplied from the commercial AC power source 12, if the inverter 5 is failed, the controller 11 selects the third operation mode. If a power failure occurs in the commercial AC power source 12 during the execution of power supply operations in accordance with the third operation mode, the controller 11 selects the fourth operation mode.

When the third operation mode is selected, as illustrated in FIG. 3(A), the controller 11 turns on the switches 2 and 7 so as to supply the AC power from the commercial AC power source 12 to the load 14 via the input switch 2 and the bypass switch 7. The controller 11 controls the converter 4 to convert the AC power supplied from the commercial AC power source 12 via the input switch 2 into DC power and store the DC power in the battery 13.

In this case, a large part of the AC input current Ii supplied from the commercial AC power source 12 via the input switch 2 is supplied to the load 14 via the bypass switch 7 as the AC output current Io, and a small part of the AC input current Ii is converted into the charge current Ic by the converter 4 and supplied to the battery 13.

When the fourth operation mode (third power supply mode) is selected, as illustrated in FIG. 3(B), the controller 11 turns off the input switch 2 while maintaining the bypass switch 7 in the ON state, and controls the converter 4 to convert the DC power of the battery 13 into AC power and supply the AC power to the load 14. In addition, the controller 11 controls the converter 4 to supply an assist current Ia to the input switch 2 so as to instantly turn off the input switch 2 when a power failure occurs, and controls the converter 4 to make the AC output current Io equal to a reference current Ior.

In this case, a large part of the discharge current Id from the battery 13 is converted into the AC output current Io by the converter 4 and supplied to the load 14, and a small part of the discharge current Id is converted into the assist current Ia by the converter 4 and supplied to the input switch 2.

Figure 4:
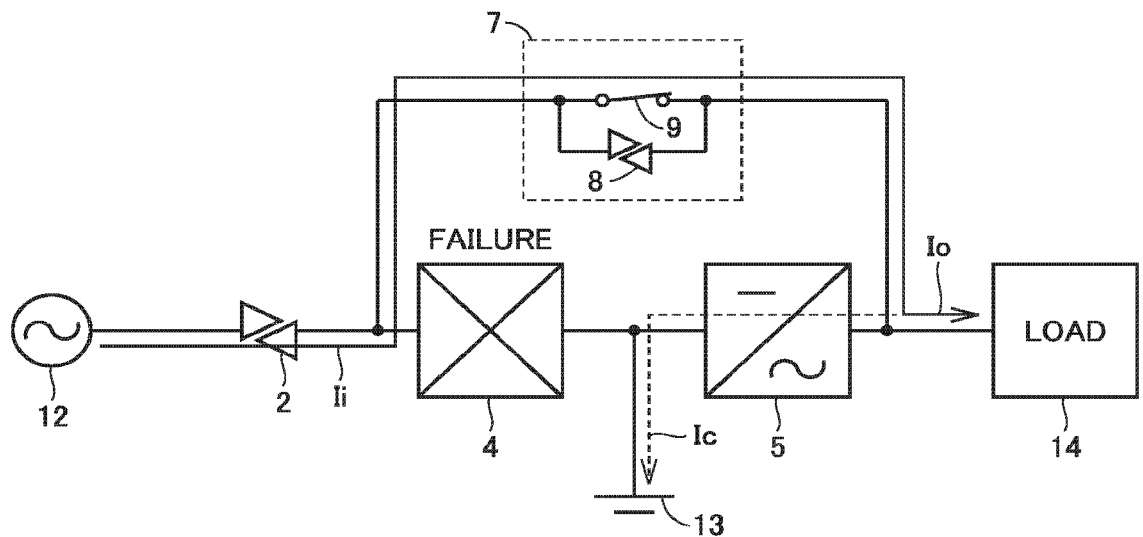
FIG. 4 is a circuit block diagram illustrating a fifth operation mode and a sixth operation mode of the uninterruptible power supply illustrated in FIG. 1.
Figure 4:
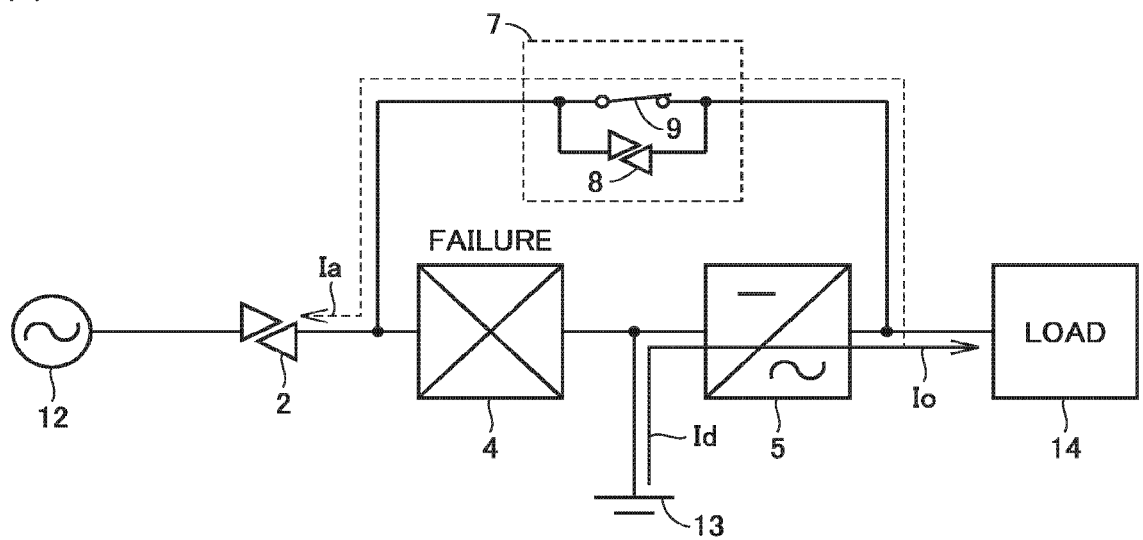

FIGS. 4(A) and 4(B) are circuit block diagrams illustrating a fifth operation mode and a sixth operation mode, respectively. When the constant bypass power supply mode is selected and AC power is normally supplied from the commercial AC power source 12, if the converter 4 is failed, the controller 11 selects the fifth operation mode. When a power failure occurs in the commercial AC power source 12 during the execution of power supply operations in accordance with the fifth operation mode, the controller 11 selects the sixth operation mode.

When the fifth operation mode (fourth power supply mode) is selected, as illustrated in FIG. 4(A), the controller 11 turns on the switches 2 and 7 so as to supply the AC power from the commercial AC power source 12 to the load 14 via the input switch 2 and the bypass switch 7. The controller 11 controls the inverter 5 to convert the AC power supplied from the commercial AC power source 12 via the switches 2 and 7 into DC power and store the DC power in the battery 13.

In this case, a large part of the AC input current Ii supplied from the commercial AC power source 12 via the input switch 2 is supplied to the load 14 via the bypass switch 7 as the AC output current Io, and a small part of the AC input current Ii is converted into the charge current Ic by the inverter 5 and supplied to the battery 13.

When the sixth operation mode (fifth power supply mode) is selected, as illustrated in FIG. 4(B), the controller 11 turns off the input switch 2 while maintaining the bypass switch 7 in the ON state, and controls the inverter 5 to convert the DC power of the battery 13 into AC power and supply the AC power to the load 14.

Further, the controller 11 controls the inverter 5 to supply an assist current Ia to the input switch 2 so as to instantly turn off the input switch 2 when a power failure occurs, and controls the inverter 5 to make the AC output current Io equal to the reference current Ior.

In this case, a large part of the discharge current Id from the battery 13 is converted into the AC output current Io by the inverter 5 and supplied to the load 14, and a small part of the discharge current Id is converted into the assist current Ia by the inverter 5 and supplied to the input switch 2.

Figure 5:
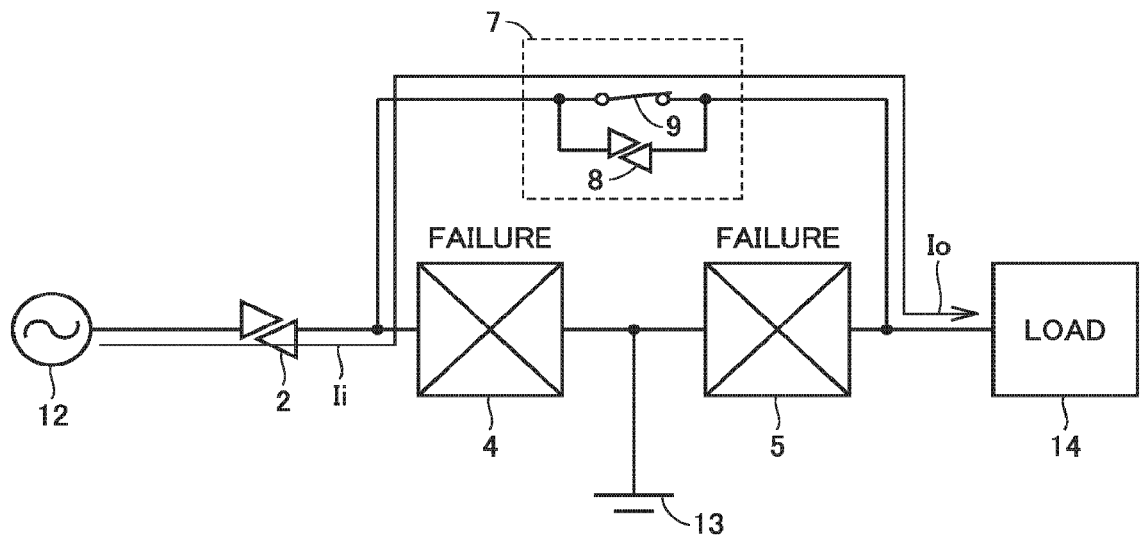
FIG. 5 is a circuit block diagram illustrating a seventh operation mode and an eighth operation mode of the uninterruptible power supply illustrated in FIG. 1.
Figure 5:
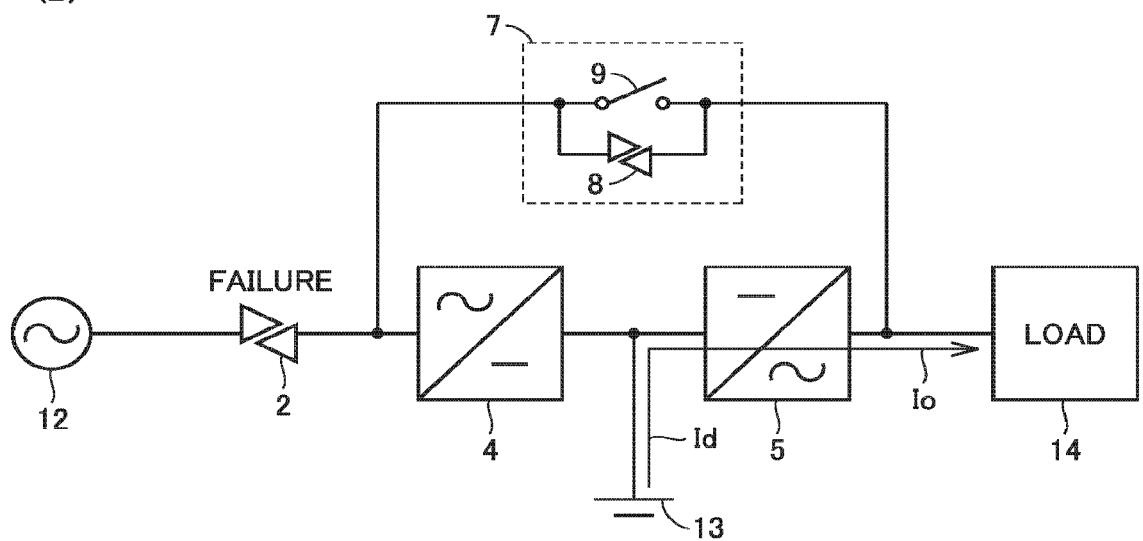

FIGS. 5(A) and 5(B) are circuit block diagrams illustrating a seventh operation mode and an eighth operation mode, respectively. If AC power is normally supplied from the commercial AC power source 12 but the converter 4 and the inverter 5 are failed, the controller 11 selects the seventh operation mode. On the other hand, if AC power is normally supplied from the commercial AC power source 12 but the input switch 2 is failed, the controller 11 selects the eighth operation mode. In the seventh operation mode and in the eighth operation mode, either the constant bypass power supply mode or the constant inverter power supply mode may be selected.

When the seventh operation mode is selected, as illustrated in FIG. 5(A), the controller 11 turns on the switches 2 and 7 so as to supply the AC power from the commercial AC power source 12 to the load 14 via the input switch 2 and the bypass switch 7. In this case, all the AC input current Ii supplied from the commercial AC power source 12 via the input switch 2 is supplied to the load 14 via the bypass switch 7 as the AC output current Io.

When the eighth operation mode is selected, as illustrated in FIG. 5(B), the controller 11 turns off the bypass switch 7, and controls the inverter 5 to convert the DC power of the battery 13 into AC power and supply the AC power to the load 14.

In this case, all the discharge current Id from the battery 13 is converted into the AC output current Io by the inverter 5 and supplied to the load 14. In the eighth operation mode, since the input switch 2 is failed and thereby is in the OFF state, the bypass switch 7 may be turned on.

Figure 6:
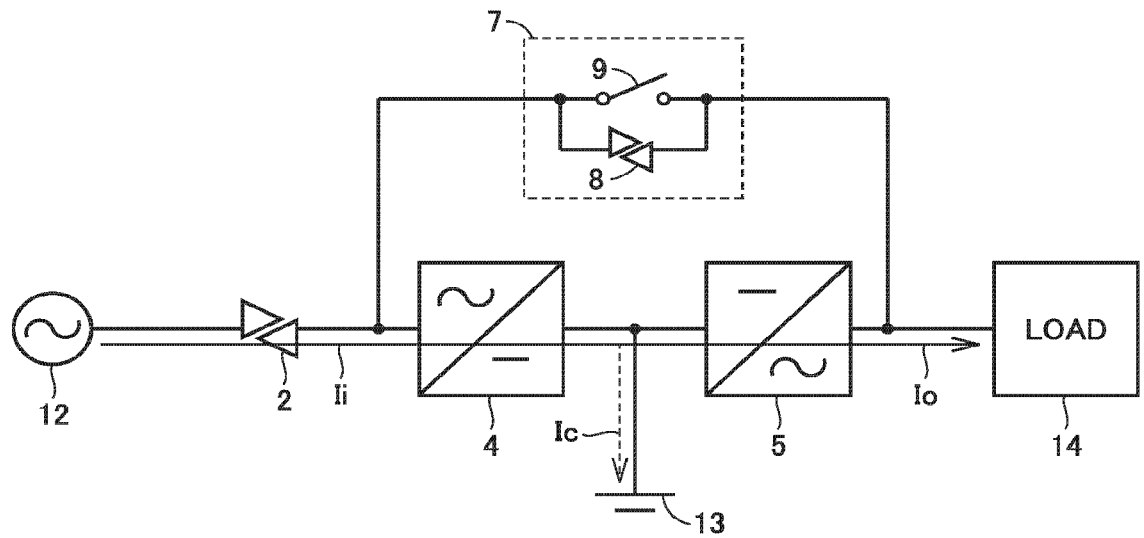
FIG. 6 is a circuit block diagram illustrating a ninth operation mode and a tenth operation mode of the uninterruptible power supply illustrated in FIG. 1.
Figure 6:
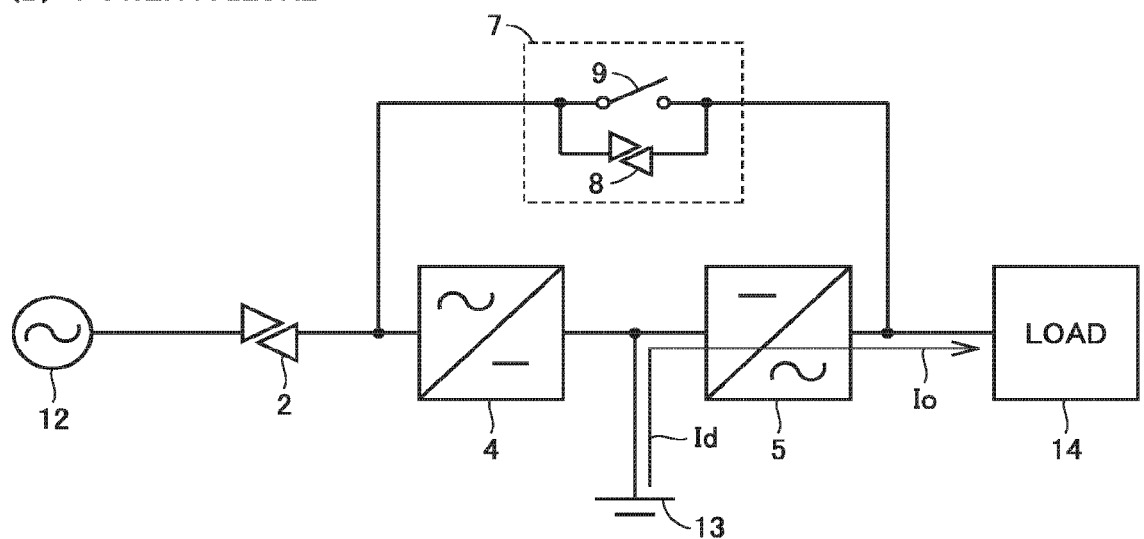

FIGS. 6(A) and 6(B) are circuit block diagrams illustrating a ninth operation mode and a tenth operation mode, respectively. When the constant inverter power supply mode is selected and AC power is normally supplied from the commercial AC power source 12, the controller 11 selects the ninth operation mode and executes power supply operations in accordance with the ninth operation mode. When a power failure occurs in the commercial AC power source 12 during the execution of power supply operations in accordance with the ninth operation mode, the controller 11 selects the tenth operation mode and executes power supply operations in accordance with the tenth operation mode.

When the ninth operation mode (sixth power supply mode) is selected, as illustrated in FIG. 6(A), the controller 11 turns on the input switch 2 but turns off the bypass switch 7. In addition, the controller 11 controls the converter 4 to convert AC power supplied from the commercial AC power source 12 via the input switch 2 into DC power, and supply the DC power to the inverter 4 while storing the DC power in the battery 13. Further, the controller 11 controls the inverter 5 to convert the DC power supplied from the converter 4 into AC power and supply the AC power to the load 14.

In this case, a large part of the AC input current Ii supplied from the commercial AC power source 12 via the input switch 2 is converted into the AC output current Io by the converter 4 and the inverter 5 and supplied to the load 14, and a small part of the AC input current Ii is converted into the charge current Ic by the converter 4 and supplied to the battery 13.

When the tenth operation mode (seventh power supply mode) is selected, as illustrated in FIG. 6(B), the controller 11 turns off the input switch 2 and the bypass switch 7, and controls the inverter 5 to convert the DC power of the battery 13 into AC power and supply the AC power to the load 14. In this case, all the discharge current Id from the battery 13 is converted into the AC output current Io by the inverter 5 and supplied to the load 14.

In the constant inverter power supply mode, the AC voltage Vi supplied from the commercial AC power source 12 is converted into the DC voltage VDC by the converter 4, and the DC voltage VDC is converted into the AC voltage Vo by the inverter 5 and supplied to the load 14, and thereby, it is possible to supply the AC voltage VO to the load 14 at a high quality. However, since power loss constantly occurs in the converter 4 and the inverter 5 in the constant inverter power supply mode, the power loss will be greater.

On the other hand, in the constant bypass power supply mode, since the AC voltage from the commercial AC power source 12 is supplied to the load 14 without conversion, the AC voltage Vo supplied to the load 14 has a low quality. However, in the constant bypass power supply mode, the power loss in the converter 4 and the inverter 5 is smaller than that in the constant inverter power supply mode. Therefore, the constant bypass power supply mode is also referred to as an ecologic mode.

Figure 7:
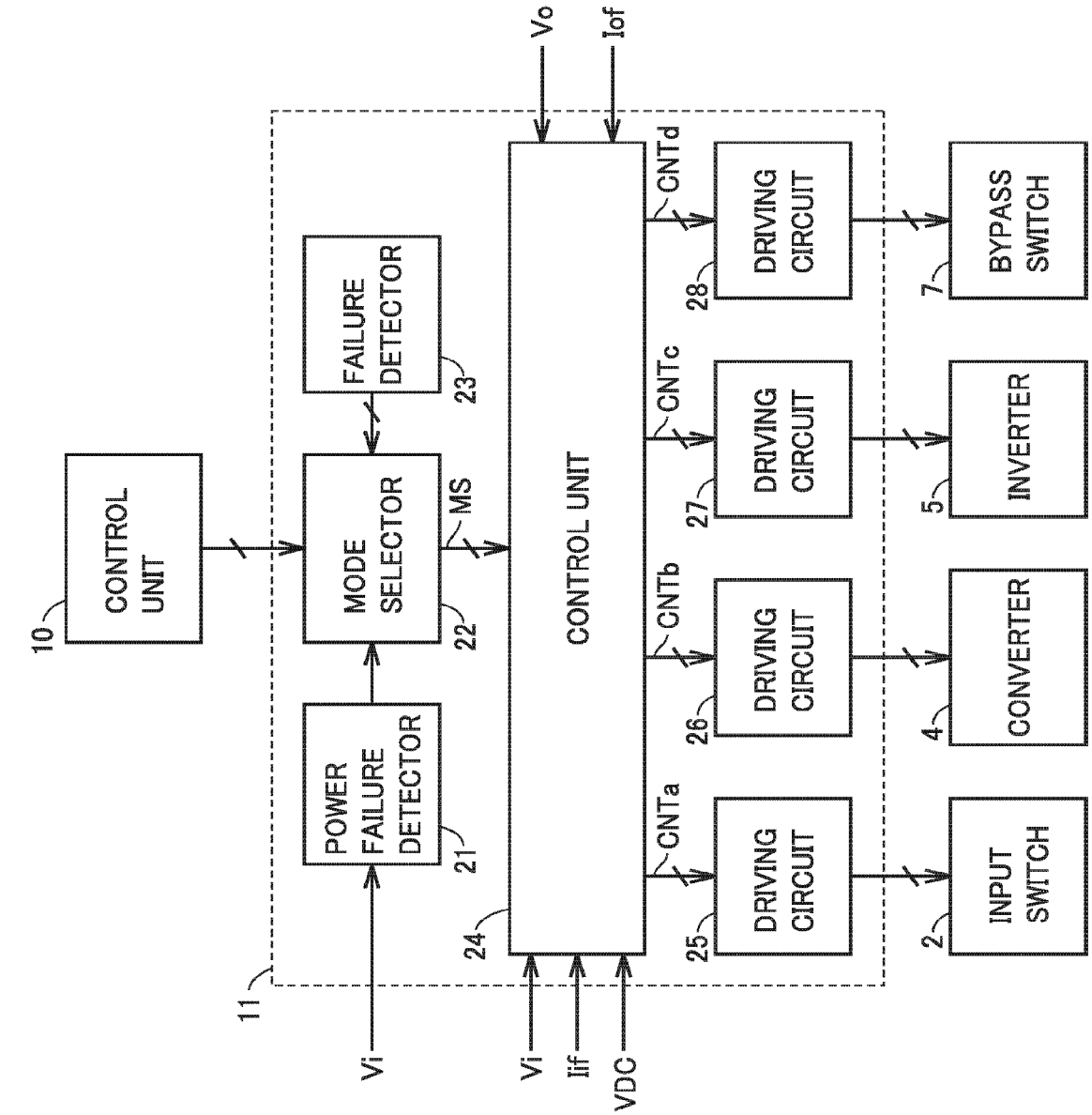
FIG. 7 is a block diagram illustrating a configuration of a controller illustrated in FIG. 1.

FIG. 7 is a block diagram illustrating a configuration of the controller 11. In FIG. 7, the controller 11 includes a power failure detector 21, a failure detector 23, a mode selector 22, a control unit 24, and driving circuits 25 to 28.

The operation unit 10 outputs a signal indicating whether the constant bypass power supply mode or the constant inverter power supply mode is selected to the mode selector 22. The power failure detector 21 detects the AC input voltage Vi, determines that AC power is normally supplied from the commercial AC power source 12 when the detected value is higher than a predetermined threshold voltage, and outputs a signal indicating that the commercial AC power source 12 is normal to the mode selector 22. When the detected value of the AC input voltage Vi is lower than the predetermined threshold voltage, the power failure detector 21 determines that AC power is not normally supplied from the commercial AC power source 12, and outputs a signal indicating that a power failure occurs in the commercial AC power source 12 to the mode selector 22.

The failure detector 23 determines whether or not each of the input switch 2, the converter 4 and the inverter 5 is normal, and outputs a signal indicating the determination result to the mode selector 22. The failure detector 23 detects, for example, the inter-terminal voltage of the thyristors $2a$ and $2b$ constituting the input switch 2, the inter-terminal voltage of the plurality of IGBTs constituting the converter 4, and the inter-terminal voltage of the plurality of IGBTs constituting the inverter 5, and determines the presence or absence of a failure based on the detection results.

Alternatively, the failure detector 23 detects, for example, a current flowing through each of the thyristors $2a$ and $2b$ constituting the input switch 2, a current flowing through each of the IGBTs constituting the converter 4, and a current flowing through each of the IGBTs constituting the inverter 5, and determines the presence or absence of a failure based on the detection results.

The mode selector 22 selects any operation mode from the first to tenth operation modes based on the signal from the operation unit 10, the signal from the power failure detector 21, and the signal from the failure detector 23, and outputs a signal MS indicating the selected operation mode to the control unit 24. The method of selecting an operation mode has been described above with reference to FIGS. 2 to 6.

The control unit 24, based on the signal MS from the mode selector 22, the AC input voltage Vi, the AC input current Ii, the DC voltage VDC, the AC output current Io, and the AC output voltage Vo, generates control signals CNTa, CNTb, CNTc and CNTd for executing power supply operations in accordance with the selected operation mode.

Figure 8:
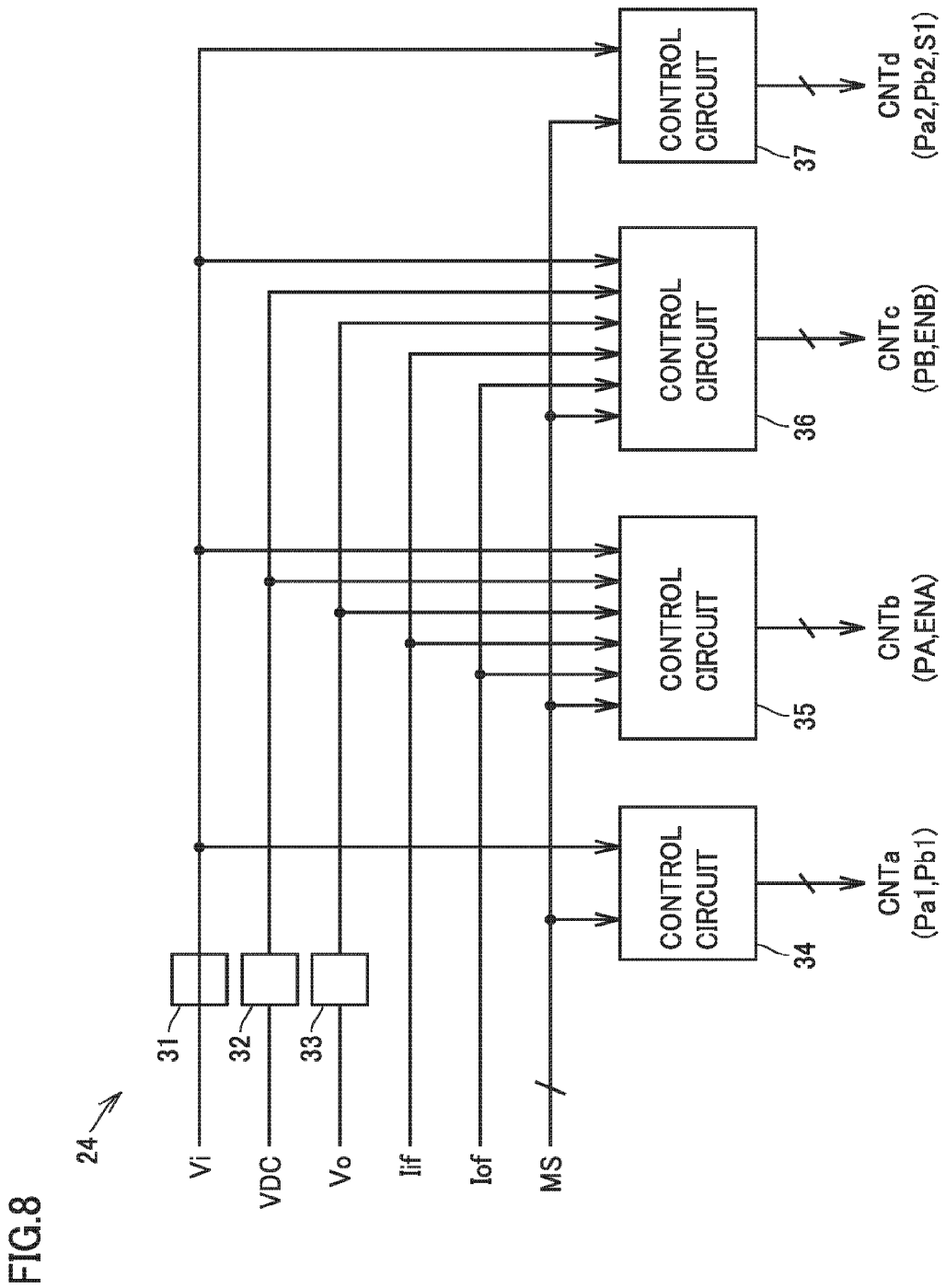
FIG. 8 is a block diagram illustrating a configuration of a control unit illustrated in FIG. 7.

FIG. 8 is a block diagram illustrating a configuration of the control unit 24. In FIG. 8, the control unit 24 includes voltage detectors 31 to 33 and control circuits 34 to 37. The voltage detector 31 detects an instantaneous value of the AC input voltage Vi, and outputs a signal indicating the detected value to the control circuits 34 to 37, respectively. The voltage detector 32 detects an instantaneous value of the DC voltage VDC, and outputs a signal indicating the detected value to the control circuits 35 and 36, respectively. The voltage detector 33 detects an instantaneous value of the AC output voltage Vo, and outputs a signal indicating the detected value to the control circuits 35 and 36, respectively.

The control circuit 34 generates a control signal CNTa for controlling the input switch 2 based on the output signal of the voltage detector 31 indicating the AC input voltage Vi and the signal MS indicating the selected operation mode. The control signal CNTa includes pulse signals Pa1 and Pb1 for turning on the thyristors $2a$ and $2b$, respectively.

In the first, third, fifth, seventh and ninth operation modes as illustrated in FIGS. 2(A), 3(A), 4(A), 5(A) and 6(A), respectively, the control circuit 34 generates a control signal CNTa to turn on the input switch 2. In other words, the control circuit 34 outputs the pulse signal Pa1 to turn on the thyristor $2a$ when the polarity of the AC input voltage Vi becomes positive, and outputs the pulse signal Pb1 to turn on the thyristor $2b$ when the polarity of the AC input voltage Vi becomes negative. Each of the thyristors $2a$ and $2b$ is turned off when the current in the forward bias direction becomes 0 A.

In the second, fourth, sixth, eighth, and tenth operation modes as illustrated in FIGS. 2(B), 3(B), 4(B), 5(B) and 6(B), respectively, the control circuit 34 generates a control signal CNTa to turn off the input switch 2. In this case, the control circuit 34 does not output the pulse signals Pa1 and Pb1, and thereby the thyristors $2a$ and $2b$ are not turned on.

The control circuit 35, based on the output signal of the voltage detector 31 indicating the AC input voltage Vi, the output signal of the voltage detector 32 indicating the DC voltage VDC, the output signal of the voltage detector 33 indicating the AC output voltage Vo, the output signal Iif of the current detector 3 indicating the AC input current Ii, the output signal Iof of the current detector 6 indicating the AC output current Io, and the signal MS indicating the selected operation mode, generates a control signal CNTb for controlling the converter 4. The control signal CNTb includes a plurality of PWM (Pulse Width Modulation) signals PA, each of which controls a respective one of the plurality of IGBTs included in the converter 4, and a signal ENA which activates or deactivates the driving circuit 26.

In the first, third and ninth operation modes as illustrated in FIGS. 2(A), 3(A) and 6(A), respectively, the control circuit 35 controls the converter 4 to convert AC power supplied from the commercial AC power source 12 via the input switch 2 into DC power and store the DC power in the battery 13.

At this time, the control circuit 35 generates a current command value Iic1 having a value corresponding to a difference ΔVDC between the reference voltage VDCr and the DC voltage (ΔVDC=VDCr-VDC), and generates a sinusoidal voltage command value Vic1 based on a difference ΔIi between the current command value Iic1 and the AC input current Ii (ΔIi=Iic1-Ii) and the AC input voltage Vi, and generates a plurality of PWM signals PA based on the voltage command value Vic1. The control circuit 35 activates the driving circuit 26 by setting the signal ENA to an activation level "H". Thus, the DC voltage VDC is controlled to be equal to the reference voltage VDCr.

In the second operation mode as illustrated in FIG. 2(B), the control circuit 35 controls the converter 4 to supply an assist current Ia to the input switch 2 (that is, the thyristors 2a and 2b) so as to instantly turn off the input switch 2 when a power failure occurs.

At this time, the control circuit 35 generates a current command value Iic2 having a polarity opposite to that of the AC input current Ii flowing through the input switch 2 (Iic2=-Ii), and generates a sinusoidal voltage command value Vic1 based on the current command value Iic2, and generates a plurality of PWM signals PA based on the voltage command value Vic1. The control circuit 35 activates the driving circuit 26 by setting the signal ENA to the activation level "H". Thus, an assist current Ia having the same value but the opposite polarity as the AC input current Ii flowing through the input switch 2 is supplied from the converter 4 to the input switch 2, the current flowing in the forward bias direction of the thyristors 2a and 2b of the input switch 2 becomes 0 A, and thereby, the input switch 2 is turned off instantly.

In the fourth operation mode as illustrated in FIG. 3(B), the control circuit 35 controls the converter 4 to supply an assist current Ia to the input switch 2 (that is, the thyristors 2a and 2b) so as to instantly turn off the input switch 2 when a power failure occurs, and controls the converter 4 to make the AC output current Io equal to the reference current Ior.

At this time, the control circuit 35 generates a current command value Iic2 having a polarity opposite to that of the AC input current Ii flowing through the input switch 2 (Iic2=-Ii), and generates a current command value Ioc1 based on a difference ΔIo between the reference current Ior and the AC output current Io (ΔIo=Ior-Io), and adds the current command value Iic2 and the current command value Ioc1 to generate a current command value Ioc2. The control circuit 35 generates a sinusoidal voltage command value Vocl based on the current command value Ioc2, and generates a plurality of PWM signals PA based on the voltage command value Vocl. The control circuit 35 activates the driving circuit 26 by setting the signal ENA to the activation level "H".

Thus, an assist current Ia having the same value but the opposite polarity as the AC input current Ii flowing through the input switch 2 is supplied from the converter 4 to the input switch 2, and thereby the input switch 2 is instantly turned off. In addition, the AC output current Io is controlled to be equal to the reference current Ior.

In the fifth, sixth and seventh operation modes as illustrated in FIGS. 4(A), 4(B) and 5(A), respectively, since the converter 4 is failed, the control circuit 35 stops the generation of the plurality of PWM signals PA, and deactivates the driving circuit 26 by setting the signal ENA to a deactivation level "L". In this case, the gates of all IGBTs are maintained at the deactivation level "L", whereby all IGBTs included in the converter 4 are kept in the OFF state.

In the eighth operation mode as illustrated in FIG. 5(B), since the input switch 2 is failed, the control circuit 35 stops the generation of the plurality of PWM signals PA, and deactivates the driving circuit 26 by setting the signal ENA to the deactivation level "L". In this case, the gates of all IGBTs are maintained at the deactivation level "L", whereby all IGBTs included in the converter 4 are kept in the OFF state.

In the tenth operation mode as illustrated in FIG. 6(B), since a power failure occurs in the commercial AC power source 12, the control circuit 35 stops the generation of the plurality of PWM signals PA, and deactivates the driving circuit 26 by setting the signal ENA to the deactivation level "L". In this case, the gates of all IGBTs are maintained at the deactivation level "L", whereby all IGBTs included in the converter 4 are kept in the OFF state.

The control circuit 36, based on the output signal of the voltage detector 31 indicating the AC input voltage Vi, the output signal of the voltage detector 32 indicating the DC voltage VDC, the output signal of the voltage detector 33 indicating the AC output voltage Vo, the output signal Iif of the current detector 3 indicating the AC input current Ii, the output signal Iof of the current detector 6 indicating the AC output current Io, and the signal MS indicating the selected operation mode, generates a control signal CNTc for controlling the inverter 5. The control signal CNTc includes a plurality of PWM signals PB, each of which controls a respective one of the plurality of IGBTs included in the inverter 5, and a signal ENB which activates or deactivates the driving circuit 27.

In the first operation mode as illustrated in FIG. 2(A), the control circuit 36 generates a control signal CNTc to bring the inverter 5 into a standby state. At this time, the control circuit 36 generates a current command value Ioc11 based on the difference ΔIo between the reference current Ior and the AC output current Io (ΔIo=Ior-Io), and generates a sinusoidal voltage command value Voc11 based on the current command value Ioc11, and generates a plurality of PWM signals PB based on the voltage command value Voc11. The control circuit 36 deactivates the driving circuit 27 by setting the signal ENA to the deactivation level "L".

Thus, the inverter 5 is brought into a standby state at which it may be activated instantly. When a power failure occurs in the commercial AC power source 12, the driving circuit 27 may be activated only by setting the signal ENA to the activation level "H" so as to activate the inverter 5, and thereby it is possible to instantly supply the AC output current Io having a value equivalent to the reference current Ior from the inverter 5 to the load 14.

In the second, eighth and tenth operation modes as illustrated in FIGS. 2(B), 5(B) and 6(B), respectively, the control circuit 36 controls the inverter 5 so that the inverter 5 converts the DC power of the battery 13 into AC power and supplies the AC current Io to the load 14.

At this time, the control circuit 36 generates a current command value Ioc11 based on the difference ΔIo between the reference current Ior and the AC output current Io (ΔIo=Ior−Io), and generates a sinusoidal voltage command value Voc11 based on the current command value Ioc11, and generates a plurality of PWM signals PB based on the voltage command value Voc11. The control circuit 36 activates the driving circuit 27 by setting the signal ENA to the activation level "H". Thus, the AC output current Io having a value equivalent to the reference current Ior is supplied from the inverter 5 to the load 14 so as to drive the load 14 to operate.

When the inter-terminal voltage VDC of the battery 13 falls below a lower limit voltage VDCL, the control circuit 36 stops the generation of the plurality of PWM signals PB, and deactivates the driving circuit 27 by setting the signal ENA to the deactivation level "L". In this case, the operation of the load 14 is stopped.

In the third, fourth and seventh operation modes as illustrated in FIGS. 3(A), 3(B) and 5(A), respectively, since the inverter 5 is failed, the control circuit 36 stops the generation of the plurality of PWM signals PB, and deactivates the driving circuit 27 by setting the signal ENB to the deactivation level "L". In this case, the gates of all IGBTs are maintained at the deactivation level "L", whereby all IGBTs included in the inverter 5 are kept in the OFF state.

In the fifth operation mode as illustrated in FIG. 4(A), the control circuit 36 controls the inverter 5 to convert AC power supplied from the commercial AC power source 12 via the input switch 2 and the bypass switch 7 into DC power and store the DC power in the battery 13.

At this time, the control circuit 36 generates a current command value Iic11 having a value corresponding to a difference ΔVDC between the reference voltage VDCr and the DC voltage (ΔVDC=VDCr−VDC), and generates a sinusoidal voltage command value Vic11 based on the difference ΔIi between the current command value Ii11 and the AC input current Ii (ΔIi=Iic11−Ii) and the AC input voltage Vi, and generates a plurality of PWM signals PB based on the voltage command value Vie11. The control circuit 35 activates the driving circuit 27 by setting the signal ENB to the activation level "H". Thus, the DC voltage VDC is controlled to be equal to the reference voltage VDCr.

In the sixth operation mode as illustrated in FIG. 4(B), the control circuit 35 controls the inverter 5 to supply an assist current Ia to the input switch 2 (that is, the thyristors 2a and 2b) so as to instantly turn off the input switch 2 when a power failure occurs, and controls the inverter 5 to make the AC output current Io equal to the reference current Ior.

At this time, the control circuit 36 generates a current command value Iic12 having a polarity opposite to that of the AC input current Ii flowing through the input switch 2 (Iic12=−Ii), and generates a current command value Ioc11 based on the difference ΔIo between the reference current Ior and the AC output current Io (ΔIo=Ior−Io), and adds the current command value Iic12 and the current command value Ioc11 to generate the current command value Ioc12. The control circuit 36 generates a sinusoidal voltage command value Voc12 based on the current command value Ioc12, and generates a plurality of PWM signals PB based on the voltage command value Voc12. The control circuit 36 activates the driving circuit 27 by setting the signal ENB to the activation level "H".

Thus, an assist current Ia having the same value but the opposite polarity as the AC input current Ii flowing through the input switch 2 is supplied from the inverter 5 to the input switch 2, and thereby the input switch 2 is instantly turned off. In addition, the AC output current Io is controlled to be equal to the reference current Ior.

In the ninth operation mode as illustrated in FIG. 6(A), the control circuit 36 controls the inverter 5 so that the inverter 5 converts the DC power generated by the converter 4 into AC power and supplies the AC current Io to the load 14.

At this time, the control circuit 36 generates a current command value Ioc11 based on the difference ΔIo between the reference current Ior and the AC output current Io (ΔIo=Ior−Io), and generates a sinusoidal voltage command value Voc11 based on the current command value Ioe11, and generates a plurality of PWM signals PB based on the voltage command value Voc11. The control circuit 36 activates the driving circuit 27 by setting the signal ENB to the activation level "H". Thus, the AC output current Io having a value equivalent to the reference current Ior is supplied from the inverter 5 to the load 14 so as to drive the load 14 to operate.

The control circuit 37 generates a control signal CNTd for controlling the bypass switch 7 based on the output signal of the voltage detector 31 indicating the AC input voltage Vi and the signal MS indicating the selected operation mode. The control signal CNTd includes pulse signals Pa2 and Pb2 for turning on the thyristors 8a and 8b of the thyristor switch 8, respectively, and a signal S1 for controlling the ON and OFF of the electromagnetic contactor 9.

In the first, third, fourth, fifth, sixth and seventh operation modes as illustrated in FIGS. 2(A), 3(A), 3(B), 4(A), 4(B) and 5(A), respectively, the control circuit 37 generates the control signal CNTd so as to turn on the bypass switch 7.

At this time, the control circuit 37 turns on the electromagnetic contactor 9 by setting the signal S1 to the activation level "H". In order to turn on the bypass switch 7 instantly, the control circuit 37 outputs the pulse signal Pa2 when the polarity of the AC input voltage Vi becomes positive, and outputs the pulse signal Pb2 when the polarity of the AC input voltage Vi becomes negative, whereby turns on the thyristor switch 8 for a predetermined time.

In the second, eighth, ninth and tenth operation modes as illustrated in FIGS. 2(B), 5(B), 6(A) and 6(B), respectively, the control circuit 37 generates the control signal CNTd so as to turn on the bypass switch 7. At this time, the control circuit 37 turns off the electromagnetic contactor 9 by setting the signal S1 to the deactivation level "L". Further, the control circuit 37 does not output the pulse signals Pa2 and Pb2, and thereby the thyristor switch 8 is not turned on.

Referring back to FIG. 7, the driving circuit 25 supplies the pulse signals Pa1 and Pb1 output from the control circuit 34 to the gates of the thyristors 2a and 2b, respectively. When the pulse signals Pa1 and Pb1 are supplied to the gates of the thyristors 2a and 2b, the thyristors 2a and 2b are turned on, and thereby the input switch 2 is turned on.

The driving circuit 26 is activated when the signal ENA from the control circuit 35 is set to the activation level "H", and in response to the plurality of PWM signals PA from the control circuit 35, the driving circuit 26 turns on and off each of the plurality of IGBTs included in the converter 4. Thereby, the forward conversion operation or the reverse conversion operation of the converter 4 is enabled. When the signal ENA from the control circuit 35 is set to the deactivation level "L", the driving circuit 26 is deactivated, and thereby each of the plurality of IGBTs included in the converter 4 is turned off. Thus, the operation of the converter 4 is stopped.

The driving circuit 27 is activated when the signal ENB from the control circuit 36 is set to the activation level "H". The driving circuit 27 turns on and off each of the plurality of IGBTs included in the inverter 5 in response to the plurality of PWM signals PB from the control circuit 36. Thereby, the reverse conversion operation or the forward conversion operation of the inverter 5 is enabled. The driving circuit 27 is deactivated when the signal ENB from the control circuit 36 is set to the deactivation level "L", and thereby each of the plurality of IGBTs included in the inverter 5 is turned off. Thus, the inverter 5 is brought into a standby state.

The driving circuit 28 turns on the electromagnetic contactor 9 when the signal S1 output from the control circuit 37 is set to the activation level "H", and turns off the electromagnetic contactor 9 when the signal S1 is set to the deactivation level "L". The driving circuit 28 supplies the pulse signals Pa2 and Pb2 output from the control circuit 37 to the gates of the thyristors 8a and 8b of the thyristor switch 8, respectively. When the pulse signals Pa2 and Pb2 are supplied to the gates of the thyristors 8a and 8b, the thyristors 8a and 8b are turned on, and thereby the thyristor switch 8 is turned on.

Next, the operation of the uninterruptible power supply 1 will be described. When AC power is normally supplied from the commercial AC power source 12 (i.e., the commercial AC power source 12 is normal) and the constant bypass power supply mode is selected from the operation unit 10 (FIG. 7), the mode selector 22 selects the first operation mode (FIG. 7).

In this case, as illustrated in FIG. 2(A), the input switch 2 and the bypass switch 7 are turned on, the AC power supplied from the commercial AC power source 12 is supplied to the load 14 via the switches 2 and 7 so as to drive the load 14 to operate.

In addition, the AC power supplied from the commercial AC power source 12 is converted into DC power by the converter 4 and stored in the battery 13. Further, the control circuit 36 (FIG. 8) generates a plurality of PWM signals PB and sets the signal ENB the deactivation level "L", and thereby the plurality of PWM signals PB are blocked by the driving circuit 27 (FIG. 7). Thus, the inverter 5 is brought into a standby state.

If the supply of AC power from the commercial AC power source 12 is stopped while the first operation mode is being selected, when the power failure detector 21 (FIG. 7) detects that the commercial AC power source 12 is failed, the mode selector 22 (FIG. 7) selects the second operation mode.

In this case, as illustrated in FIG. 2(B), the bypass switch 7 is turned off, the DC power of the battery 13 is converted into AC power by the converter 5, and an assist current Ia having a polarity opposite to that of the AC input current Ii is supplied from the converter 4 to the input switch 2, whereby the input switch 2 is turned off instantly.

The control circuit 36 (FIG. 8) sets the signal ENB to the activation level "H", and the driving circuit 27 drives the inverter 5 to convert the DC power of the battery 13 into AC power and supply the AC power to the load 14. Therefore, as long as there is DC power stored in the battery 13, the load 14 may be driven to operate continuously.

If the inverter 5 is failed while the first operation mode is being selected, when the failure detector 23 (FIG. 7) detects that the inverter 5 is failed, the mode selector 22 selects the third operation mode.

In this case, as illustrated in FIG. 3(A), the input switch 2 and the bypass switch 7 are maintained in the ON state, the AC power is supplied from the commercial AC power source 12 to the load 14 via the switches 2 and 7, and thereby the load 14 is driven to operate continuously.

In addition, the AC power supplied from the commercial AC power source 12 is converted into DC power by the converter 4 and stored in the battery 13. Further, the control circuit 36 (FIG. 8) stops the generation of the plurality of PWM signals PB and sets the signal ENB to the deactivation level "L", and the driving circuit 27 turns off all IGBTs included in the inverter 5.

If a power failure occurs in the commercial AC power source 12 while the third operation mode is being selected, when the power failure detector 21 (FIG. 7) detects the power failure of the commercial AC power source 12, the mode selector 22 (FIG. 7) selects the fourth operation mode.

In this case, as illustrated in FIG. 3(B), the DC power of the battery 13 is converted into AC power by the converter 4, and an assist current Ia having a polarity opposite to that of the AC input current Ii is supplied from the converter 4 to the input switch 2, whereby the input switch 2 is turned off instantly. Also, the DC power of the battery 13 is converted into AC power by the converter 4 and supplied to the load 14 via the bypass switch 7. Therefore, as long as there is DC power stored in the battery 13, the load 14 may be driven to operate continuously.

If the converter 4 is failed while the first operation mode is being selected, when the failure detector 23 (FIG. 7) detects that the converter 4 is failed, the mode selector 22 selects the fifth operation mode.

In this case, as illustrated in FIG. 4(A), the input switch 2 and the bypass switch 7 are maintained in the ON state, the AC power is supplied from the commercial AC power source 12 to the load 14 via the switches 2 and 7, and thereby the load 14 is driven to operate continuously.

In addition, the AC power supplied from the commercial AC power source 12 is converted into DC power by the inverter 5 and stored in the battery 13. Further, the control circuit 35 (FIG. 8) stops the generation of the plurality of PWM signals PA and sets the signal ENA to the deactivation level "L", and the driving circuit 26 turns off all IGBTs included in the converter 4.

If a power failure occurs in the commercial AC power source 12 while the fifth operation mode is being selected, when the power failure detector 21 (FIG. 7) detects the power failure of the commercial AC power source 12, the mode selector 22 (FIG. 7) selects the sixth operation mode.

In this case, as illustrated in FIG. 4(B), the DC power of the battery 13 is converted into AC power by the inverter 5, and an assist current Ia having a polarity opposite to that of the AC input current Ii is supplied from the inverter 5 to the input switch 2 via the bypass switch 7, whereby the input switch 2 is turned off instantly. Also, the DC power of the battery 13 is converted into AC power by the inverter 5 and supplied to the load 14. Therefore, as long as there is DC power stored in the battery 13, the load 14 may be driven to operate continuously.

If the converter 4 and the inverter 5 are both failed while the first operation mode is being selected, when the failure detector 23 (FIG. 7) detects that the converter 4 and the inverter 5 are both failed, the mode selector 22 selects the seventh operation mode.

In this case, as illustrated in FIG. 5(A), the input switch 2 and the bypass switch 7 are maintained in the ON state, the AC power is supplied from the commercial AC power source 12 to the load 14 via the switches 2 and 7, and thereby the load 14 is driven to operate continuously.

Further, the control circuit 35 (FIG. 8) stops the generation of the plurality of PWM signals PA and sets the signal ENA the deactivation level "L", and the driving circuit 26 turns off all IGBTs included in the converter 4. Furthermore, the control circuit 36 (FIG. 8) stops the generation of the plurality of PWM signals PB and sets the signal ENB the deactivation level "L", and the driving circuit 27 turns off all IGBTs included in the inverter 5.

If the input switch 2 is failed while the first operation mode is being selected, when the failure detector 23 (FIG. 7) detects that the input switch 2 is failed, the mode selector 22 selects the eighth operation mode.

In this case, as illustrated in FIG. 5(B), the DC power of the battery 13 is converted into AC power by the inverter 5 and supplied to the load 14. Therefore, as long as there is DC power stored in the battery 13, the load 14 may be driven to operate continuously. Further, the control circuit 34 (FIG. 8) stops the generation of the pulse signals Pa1 and Pb1, whereby the input switch 2 is turned off. The control circuit 37 (FIG. 8) sets the signal S1 to the deactivation level "L", whereby the bypass switch 7 is turned off.

When the commercial AC power source 12 is normal and the constant inverter power supply mode is selected from the operation unit 10 (FIG. 7), the mode selector 22 (FIG. 7) selects the ninth operation mode.

In this case, as illustrated in FIG. 6(A), the input switch 2 is turned on, the bypass switch 7 is turned off, and the AC power supplied from the commercial AC power source 12 via the input switch 2 is converted into DC power by the converter 4. The DC power converted by converter 4 is partially stored in battery 13 and partially converted into AC power by inverter 5, and the AC power is supplied to the load 14 to drive the load 14 to operate.

If the supply of AC power from the commercial AC power source 12 is stopped while the ninth operation mode is being selected, when the power failure detector 21 (FIG. 7) detects a power failure of the commercial AC power source 12, the mode selector 22 (FIG. 7) selects the tenth operation mode.

In this case, as illustrated in FIG. 6(B), the input switch 2 is turned off, and the DC power of the battery 13 is converted into AC power by the inverter 5 and supplied to the load 14. Therefore, as long as there is DC power stored in the battery 13, the load 14 may be driven to operate continuously.

As described above, in the first embodiment, when the input switch 2 is connected between the input terminal T1 and the AC node 4a of the converter 4 and the fourth operation mode is selected, the input switch 2 is turned off, the bypass switch 7 is turned on, and the converter 4 is controlled to convert the DC power of the battery 13 into AC power and supply the AC power to the load 14 via the bypass switch 7. Therefore, even if the inverter 5 is failed and the commercial AC power source 12 is failed, it is possible to drive the load 14 to operate by selecting the fourth operation mode.

Second Embodiment

Figure 9:
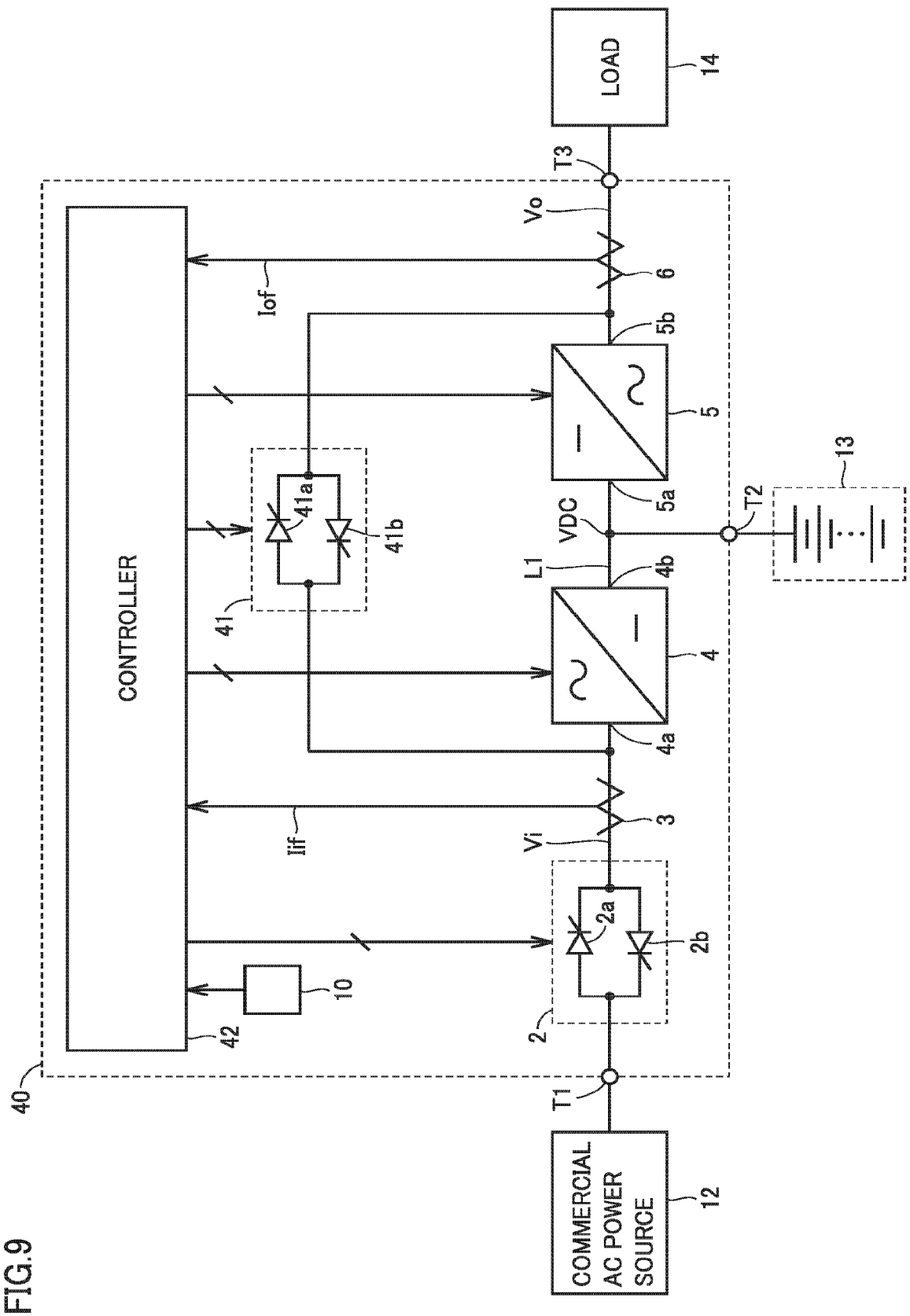
FIG. 9 is a circuit block diagram illustrating a configuration of an uninterruptible power supply according to a second embodiment.

FIG. 9 is a circuit block diagram illustrating a configuration of an uninterruptible power supply 40 according to a second embodiment of the present invention, which is different from that illustrated in FIG. 1. Referring to FIG. 9, the uninterruptible power supply 40 is different from the uninterruptible power supply 1 of FIG. 1 in that a bypass switch 41 is adopted to replace the bypass switch 7 and a controller 42 is adopted to replace the controller 11.

Similarly to the input switch 2, the bypass switch 41 includes a pair of thyristors 41a and 41b connected in antiparallel to each other. An anode and a cathode of the thyristor 41a are connected to the AC nodes 4a and 5b, respectively, and an anode and a cathode of the thyristor 41b are connected to the AC nodes 5b and 4a, respectively. The thyristors 41a and 41b of the bypass switch 41 have the same size as the thyristors 2a and 2b of the input switch 2.

The controller 42 operates in the same manner as the controller 11. However, when the bypass switch 41 is turned on, the controller 42 generates pulse signals Pa3 and Pb3 in synchronization with the AC voltage supplied from the commercial AC power source 12, the converter 4 or the inverter 5, and supplies the generated pulse signals Pa3 and Pb3 to the respective gates of the thyristors 41a and 41b so as to turn on the thyristors 41a and 41b. When the bypass switch 41 is turned off, the controller 42 stops the generation of the pulse signals Pa3 and Pb3 so as to turn off the thyristors 41a and 41b. Thus, the same effect as that of the first embodiment may be obtained in the second embodiment.

It should be understood that the embodiments disclosed herein are illustrative and non-restrictive in every respect. The scope of the present invention is defined by the terms of the claims rather than the description of the embodiments above and is intended to include any modifications within the scope and meaning equivalent to the terms of the claims.

REFERENCE SIGNS LIST 1, 40: uninterruptible power supply; T1: input terminal; T2: battery terminal; T3: output terminal; 2: input switch; 2a, 2b, 8a, 8b, 41a, 41b: thyristor; 3, 6: current detector; 4: converter; L1: DC line; 5: inverter; 7, 41: bypass switch; 10: operation unit; 11, 42: controller; 12: commercial AC power source; 13: battery; 14: load; 21: power failure detector; 22: failure detector; 23: mode selector; 24: control unit; 25, 26, 27, 28: driving circuit; 31, 32, 33: voltage detector; 34, 35, 36, 37: control circuit

The invention claimed is:
1. An uninterruptible power supply comprising:
a first switch that has one terminal receiving AC power supplied from an AC power source and has the other terminal connected to an AC node;
a second switch that has one terminal connected to the AC node and has the other terminal connected to a load;
a first power converter that exchanges power between the AC node and a power storage device;
a second power converter that exchanges power between the power storage device and the other terminal of the second switch; and
a controller that selects any power supply mode from a first power supply mode, a second power supply mode and a third power supply mode, and executes power supply operations in accordance with the selected power supply mode, wherein
when the first power supply mode is selected, the controller turns on the first switch and the second switch so as to supply AC power from the AC power source to the load via the first switch and the second switch, and controls the first power converter so as to convert the

AC power supplied from the AC power source via the first switch into DC power and store the DC power in the power storage device, when the second power supply mode is selected, the controller turns off the first switch, and controls the second power converter so as to convert the DC power of the power storage device into AC power and supply the AC power to the load, and when the third power supply mode is selected, the controller turns off the first switch and turns on the second switch, and controls the first power converter so as to convert the DC power of the power storage device into AC power and supply the AC power to the load via the second switch, wherein the first switch includes a first thyristor and a second thyristor connected in antiparallel to each other, and when the second power supply mode and the third power supply mode are selected, the controller further controls the first power converter to supply an assist current to the first switch to turn off the first switch.

2. The uninterruptible power supply according to claim 1, wherein the controller selects the first power supply mode when the first power converter and the second power converter are normal and the AC power source is normal, the controller selects the second power supply mode when the first power converter and the second power converter are normal and the AC power source is failed, and the controller selects the third power supply mode when the second power converter is failed and the AC power source is failed.

3. The uninterruptible power supply according to claim 1, wherein the controller selects a power supply mode from the first power supply mode, the second power supply mode, the third power supply mode, a fourth power supply mode and a fifth power supply mode and the controller executes power supply operations in accordance with the selected power supply mode such that:

when the fourth power supply mode is selected, the controller turns on the first switch and the second switch to supply AC power from the AC power supply to the load via the first switch and the second switch, and controls the second power converter to convert the AC power supplied from the AC power supply via the first switch and the second switch into DC power and store the DC power in the power storage device, and when the fifth power supply mode is selected, the controller turns off the first switch, and controls the second power converter to convert the DC power of the power storage device into AC power and supply the AC power to the load.

4. The uninterruptible power supply according to claim 3, wherein the controller selects the fourth power supply mode when the first power converter is failed but the AC power source is normal, and the controller selects the fifth power supply mode when the first power converter is failed and the AC power supply is failed.

5. The uninterruptible power supply according to claim 3, wherein the first switch includes a first thyristor and a second thyristor connected in antiparallel to each other, and when the fifth power supply mode is selected, the controller further turns on the second switch, and controls the second power converter to supply an assist current to the first switch via the second switch so as to turn off the first switch.

6. The uninterruptible power supply according to claim 3, wherein the controller selects any power supply mode from the first power supply mode, the second power supply mode, the third power supply mode, the fourth power supply mode, the fifth power supply mode, a sixth power supply mode, and a seventh power supply mode, when the sixth power supply mode is selected, the controller turns on the first switch and turns off the second switch, and controls the first power converter so as to convert the AC power supplied from the AC power source via the first switch into DC power and supply the DC power to the second power converter while storing the DC power in the power storage device, and controls the second power converter so as to convert the DC power supplied from the first power converter into AC power and supply the AC power to the load, and when the seventh power supply mode is selected, the controller turns off the first switch, and controls the second power converter so as to convert the DC power of the power storage device into AC power and supply the AC power to the load.

7. The uninterruptible power supply according to claim 6, further comprising:

a mode selector that selects a constant bypass power supply mode or a constant inverter power supply mode, wherein when the constant bypass power supply mode is selected by the mode selector, the controller selects any power supply mode from the first power supply mode, the second power supply mode, the third power supply mode, the fourth power supply mode, and the fifth power supply mode, and when the constant inverter power supply mode is selected by the mode selector, the controller selects any power supply mode from the sixth power supply mode and the seventh power supply mode.

8. The uninterruptible power supply according to claim 7, wherein the controller selects the sixth power supply mode when the first power converter and the second power converter are normal and the AC power source is normal, and the controller selects the seventh power supply mode when the first power converter and the second power converter are normal and the AC power source is failed.

* * * * *